United States Patent
Lee

(10) Patent No.: US 12,401,217 B2
(45) Date of Patent: Aug. 26, 2025

(54) VEHICLE POWER CONVERSION SYSTEM AND METHOD

(71) Applicants: Hyundai Motor Company, Seoul (KR); Kia Corporation, Seoul (KR)

(72) Inventor: Dae Woo Lee, Incheon (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 619 days.

(21) Appl. No.: 17/741,889

(22) Filed: May 11, 2022

(65) Prior Publication Data

US 2023/0143719 A1    May 11, 2023

(30) Foreign Application Priority Data

Nov. 9, 2021    (KR) .................. 10-2021-0152949

(51) Int. Cl.
*H02J 7/00* (2006.01)
*B60L 53/24* (2019.01)
*H02M 1/42* (2007.01)

(52) U.S. Cl.
CPC ........ *H02J 7/007182* (2020.01); *B60L 53/24* (2019.02); *H02M 1/4291* (2021.05); *B60L 2210/30* (2013.01); *H02J 2207/20* (2020.01); *H02M 1/4233* (2013.01)

(58) Field of Classification Search
None
See application file for complete search history.

(56) References Cited

U.S. PATENT DOCUMENTS

| 2010/0026237 A1* | 2/2010 | Ichikawa ............... B60L 50/61 320/109 |
| 2015/0314694 A1* | 11/2015 | Alakula ................ B60L 53/14 320/109 |
| 2019/0148973 A1* | 5/2019 | Kim ........................ H02J 7/06 320/109 |
| 2020/0313441 A1 | 10/2020 | Yang et al. |

FOREIGN PATENT DOCUMENTS

KR    20200115785 A    10/2020

* cited by examiner

*Primary Examiner* — Arun C Williams
(74) *Attorney, Agent, or Firm* — Slater Matsil, LLP

(57) ABSTRACT

A vehicle power conversion system includes an input power supply including an AC power input, a battery, a power factor correction circuit connected to the input power supply, a power transmission unit including an inverter connected in parallel to the battery, a three-phase motor connected to the inverter, and at least one relay connected to the three-phase motor and configured to transfer power between the input power supply and the battery, and a buck converter including a first switching element and a second switching element, connected in parallel to the power factor correction circuit, wherein an end of the second switching element is connected in parallel to the power transmission unit, and wherein the buck converter is configured to step down an output voltage of the power factor correction circuit and transfer the stepped down output voltage.

20 Claims, 4 Drawing Sheets

VEHICLE POWER CONVERSION SYSTEM AND METHOD

CROSS-REFERENCE TO RELATED APPLICATIONS

This application claims the benefit of Korean Patent Application No. 10-2021-0152949, filed on Nov. 9, 2021, which application is hereby incorporated herein by reference.

TECHNICAL FIELD

The present invention relates to a vehicle power conversion system and method thereof.

BACKGROUND

Electric vehicles (EVs) and plug-in hybrid electric vehicles (PHEVs) require a charging device for charging a high voltage battery.

Charging devices are classified into an on-board charger (OBC) and a quick charger, and the on-board charger standardized and compatible regardless of vehicle make and model supplies general commercial AC power (e.g., 220 V) to a vehicle to charge the vehicle. The on-board charger is a device that receives electric energy (AC power) from electric vehicle supply equipment (EVSE) and charges the high voltage battery through a charging cable. It may take 4 to 6 hours for charging depending on battery capacity.

In the case of a quick charger that charges using an external power supply, a charging time is short (for example, 30 to 40 minutes) due to high-voltage and high-capacity charging because it variably supplies DC of 100 to 450 V to an electric vehicle to charge the battery.

As a combo method that enables quick charging and slow charging with a single charging port is widely adopted according to recent international trends, the necessity of a multi-charging circuit capable of both quick charging and slow charging using a single charging circuit is increasing.

An inverter is required for quick charging, and electric vehicles are basically equipped with an inverter necessary to drive a motor. Therefore, a multi-charging inverter technique for combining a relay for quick charging with an inverter for driving a motor such that the motor driving inverter can also be used as an inverter of a quick charging circuit has been used.

In addition, for slow charging, a circuit for converting AC power into DC power and boosting the DC power to a high voltage is required. Accordingly, a conventional slow charging system is configured to convert AC power into DC power through a power factor correction circuit (PFC), insulate the grid from the battery using an isolated DC-DC converter, and boost or step down the voltage.

However, since the quick charging system and the slow charging system are separately provided, there is a problem of high cost and occupying a space in a vehicle.

On the other hand, a method of using an existing inverter in a slow charging system may be proposed. However, this system requires an additional relay for changing quick charging and slow charging paths, and AC power may be applied to a motor to cause a vehicle to move during charging. To solve this problem, the W phase of the motor needs to be separated, which requires a change in the motor structure. Furthermore, the range of a battery charging voltage decreases.

Therefore, there is a need for a technology for implementing a quick charging system and a slow charging system through one system as described above.

It will be understood that the above matters described in the related art are merely for promotion of understanding of the background of the invention and should not be recognized as prior art well-known to those skilled in the art.

SUMMARY

The present invention relates to a power conversion system for charging electric vehicles and a method thereof. Particular embodiments relate to a power conversion system and method for enabling both slow charging and quick charging using an existing inverter by applying a buck converter between a power factor correction circuit and an inverter circuit for driving a motor.

Embodiments of the present invention can solve problems in the related art, and an embodiment of the present invention provides a vehicle power conversion system and method for enabling both quick charging and slow charging using a single system by connecting a quick charging system using an inverter for driving a motor to a power factor correction circuit using a buck converter.

In accordance with embodiments of the present invention, the above and other features can be accomplished by the provision of a vehicle power conversion system including an input power supply to which AC power is input, a battery of a vehicle, a power factor correction circuit connected to the input power supply, a power transmission unit including an inverter connected in parallel to the battery, a three-phase motor connected to the inverter, and at least one relay connected to the three-phase motor and transferring power between the input power supply and the battery, and a buck converter including a first switching element and a second switching element, connected in parallel to the power factor correction circuit, and configured such that one end of the second switching element is connected in parallel to the power transmission unit to step down an output voltage of the power factor correction circuit and transfer the stepped down output voltage to the power transmission unit.

The power transmission unit may include a first relay connected to a neutral terminal of the three-phase motor, a neutral terminal capacitor connected in parallel to the neutral terminal of the three-phase motor, and a second relay connected in series with the neutral terminal capacitor.

Further, the power transmission unit may control the inverter to be used to drive the motor or to be used for charging according to on/off of the first relay and the second relay.

The buck converter may serve to boost the voltage of the battery when the voltage of the battery is transferred to the input power supply.

The power factor correction circuit further includes a link capacitor connected in parallel to the power factor correction circuit and may be composed of three legs for three-phase charging.

The inverter of the power transmission unit may include a first leg including a first switching element and a third switching element, a second leg including a fourth switching element and a second switching element, and a third leg including a sixth switching element and a fifth switching element, wherein output terminals of the first to third legs may be connected to the respective phases of the motor.

In accordance with another embodiment of the present invention, there is provided a vehicle power conversion method including applying AC power to an input power supply, converting the input AC power into DC power through a power factor correction circuit, stepping down the voltage of the converted DC power to a constant voltage through a buck converter, and boosting the voltage stepped down by the buck converter to a high voltage capable of charging a battery through a power transmission unit.

The stepping down of the voltage to a constant voltage through the buck converter may be switched to boosting the voltage through the buck converter when the power of the battery is transferred to the input power supply.

The power transmission unit in the boosting of the voltage to a high voltage capable of charging the battery may also serve to drive a motor according to on/off of the first relay and the second relay.

BRIEF DESCRIPTION OF THE DRAWINGS

The above and other objects, features and other advantages of embodiments of the present invention will be more clearly understood from the following detailed description taken in conjunction with the accompanying drawings, in which.

DETAILED DESCRIPTION OF ILLUSTRATIVE EMBODIMENTS

Figure 1:
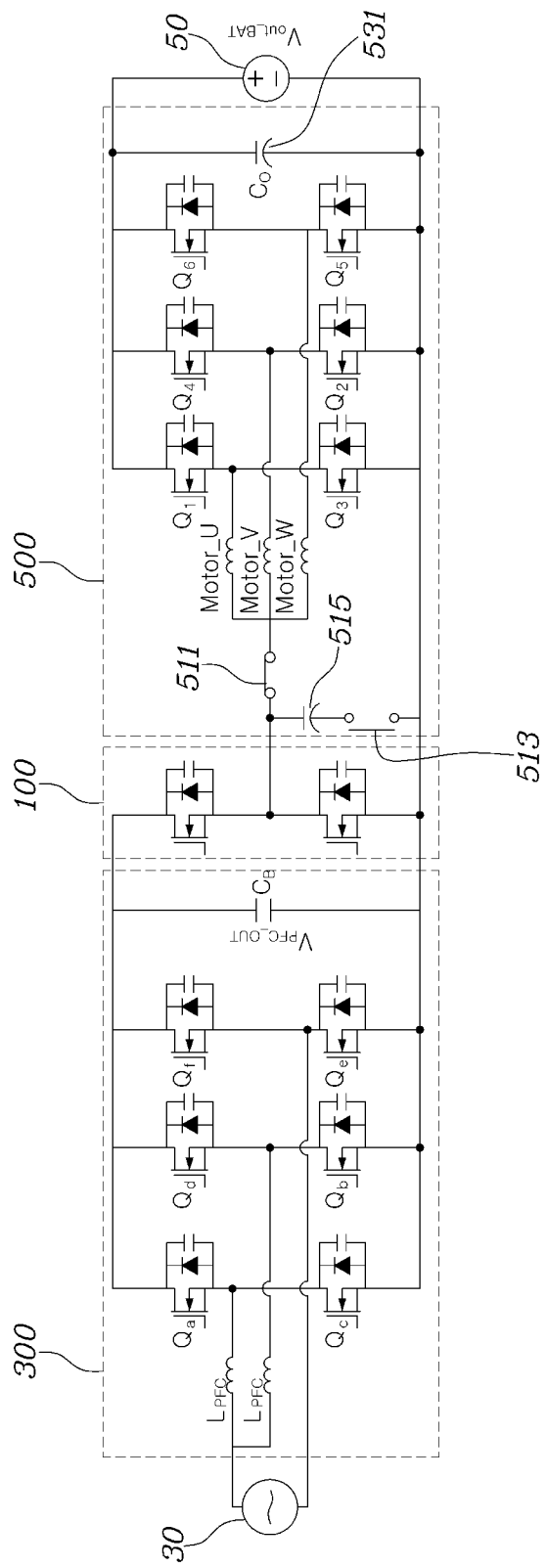
FIG. 1 is a circuit diagram of a vehicle power conversion system using a buck converter according to an embodiment of the present invention.
Figure 2:
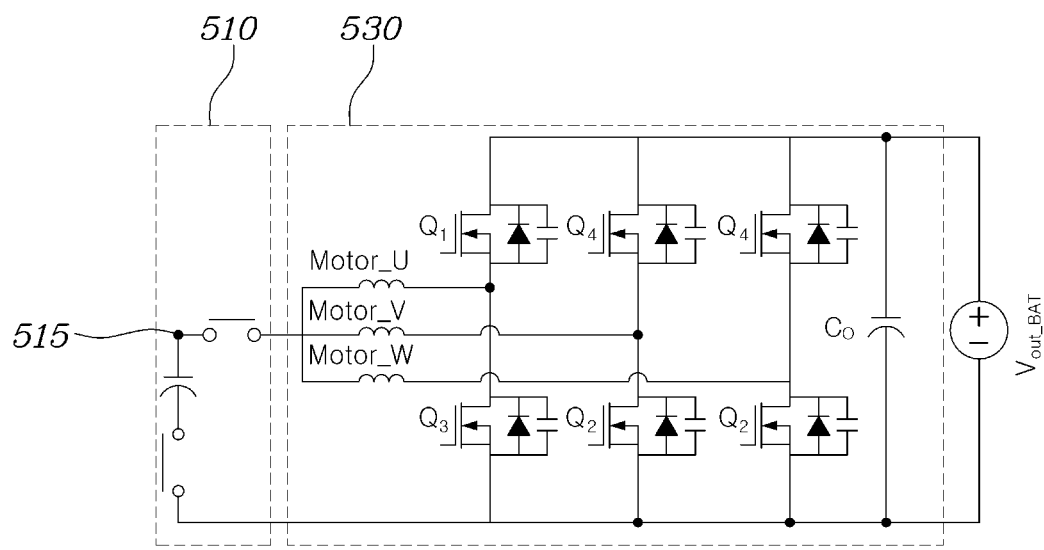
FIG. 2 is a circuit diagram of a conventional quick charging system utilizing an inverter for driving a motor.
Figure 3:
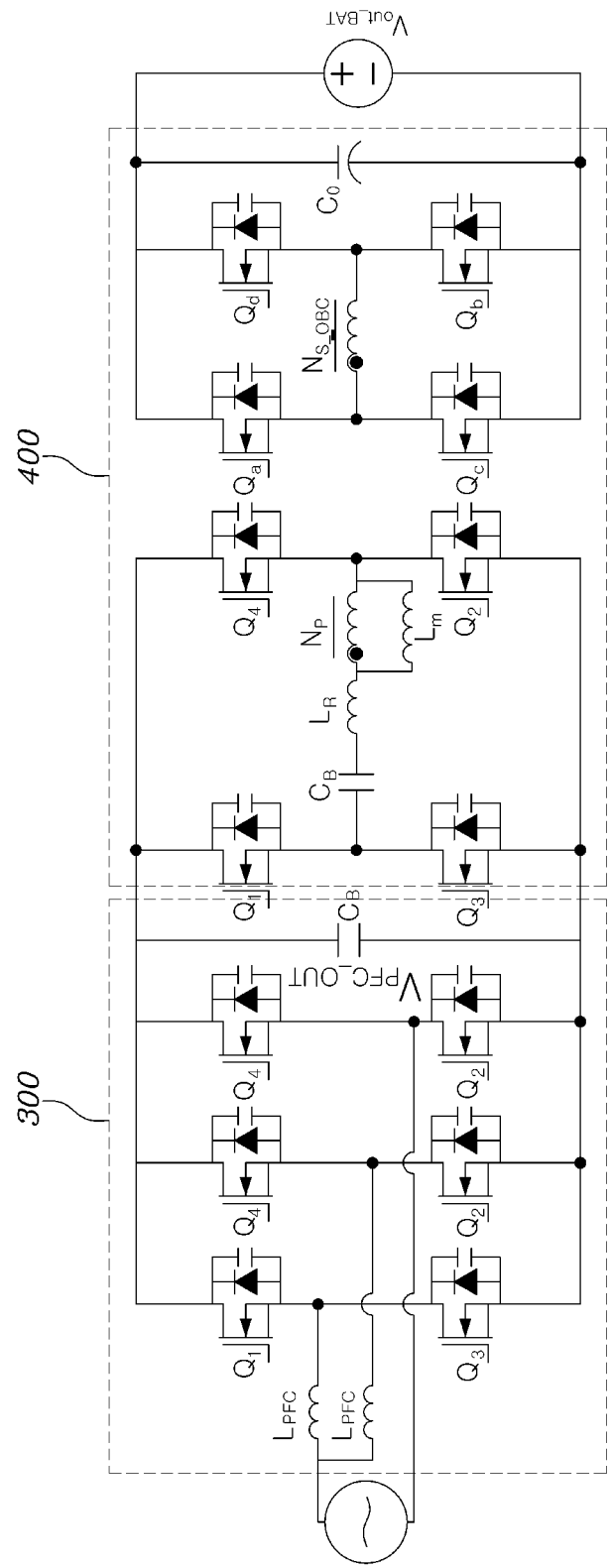
FIG. 3 is a circuit diagram of a conventional slow charging system composed of a power factor correction circuit and an isolated DC-DC converter.
Figure 4:
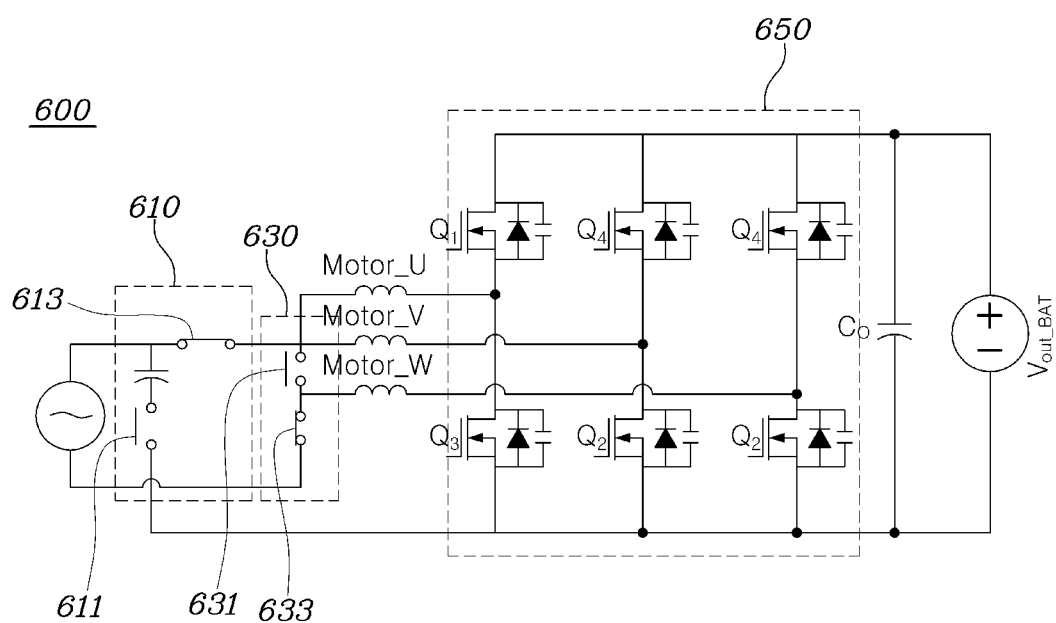
FIG. 4 is a circuit diagram of a slow charging system using an inverter for driving a motor.

FIG. 1 is a circuit diagram of a vehicle power conversion system using a buck converter according to an embodiment of the present invention, FIG. 2 is a circuit diagram of a conventional quick charging system utilizing an inverter for driving a motor, FIG. 3 is a circuit diagram of a conventional slow charging system composed of a power factor correction circuit and an isolated DC-DC converter, and FIG. 4 is a circuit diagram of a slow charging system using an inverter for driving a motor.

In order to promote understanding of embodiments of the present invention, FIG. 2 to FIG. 4 will be described first.

FIG. 2 is a circuit diagram of a conventional quick charging system using an inverter for driving a motor. Referring to FIG. 2, a relay unit 510 for quick charging is included in an inverter 530 provided to drive a motor such that the inverter can be used for quick charging according to a relay. The relay unit 510 may include a plurality of relays and a neutral terminal capacitor 515. When a DC voltage for quick charging is applied to one end of the neutral terminal capacitor 515, the plurality of relays is turned on/off, and thus the inverter is used for quick charging. This has the advantage that the inverter can be used to drive a motor or used for quick charging, but operation for slow charging cannot be performed and thus an additional slow charging system is required.

FIG. 3 is a circuit diagram of a conventional slow charging system composed of a power factor correction circuit 300 and an isolated DC-DC converter 400. Referring to FIG. 3, the conventional slow charging system includes the power factor correction circuit 300 and the isolated DC-DC converter 400. When AC power is applied, it is converted into DC power by the power factor correction circuit 300. Since the converted DC voltage may be low enough to be unsuitable for charging a high voltage battery 50, the DC voltage is boosted using the isolated DC-DC converter 400 to charge the battery 50.

FIG. 4 is a circuit diagram of a slow charging system using an inverter for driving a motor. A conventional inverter 650 provided to drive a motor is utilized for quick charging, and if additional relay units 610 and 630 are included in the inverter, the inverter may be used for slow charging. Since the power factor correction circuit 300 is not included, there is a risk that AC power is applied to the motor. If even a small amount of AC power flows to the motor, the vehicle may move during charging, increasing the risk of an accident. Therefore, in order to prevent this, the additional relay units 610 and 630 may be provided. The additional relay unit 630 may include a plurality of additional relays 631 and 633 and needs to be configured to be connected to the W phase of the motor to separate the W phase of the motor. In addition, in this process, it may be necessary to change the structure of the motor. Furthermore, this charging system has a narrower charging voltage range (320 to 800 V) than a normally required charging voltage range (288 to 800 V) of the battery 50, decreasing efficiency.

In contrast, FIG. 1 shows a power conversion system that enables both quick charging and slow charging using a single system while improving upon the problems of the systems shown in FIG. 2 to FIG. 4.

FIG. 1 is a circuit diagram of a power conversion system using a buck converter according to an embodiment of the present invention.

Referring to FIG. 1, a power conversion system circuit according to an embodiment of the present invention includes an input power supply to which AC power is input, a vehicle battery 50, a power factor correction circuit 300, a power transmission unit, and a buck converter 100.

An AC voltage is applied to the power factor correction circuit 300 by the input power supply 30. The power factor correction circuit 300 may include a bridge circuit in which four switching elements are connected, and performs a rectifying operation for converting AC into DC. Here, the power factor correction circuit 300 may be composed of three legs for three-phase charging, and in this case, six switching elements $Q_a$ to $Q_f$ may be configured in the form of a full bridge circuit. As an embodiment, the switches of the power factor correction circuit 300 may boost an output voltage through duty ratio control for pulse width modulation (PWM). In addition, each leg of the power factor correction circuit 300 may include an inductor component. The power factor correction circuit 300 may include a link capacitor, and the link capacitor is connected in parallel with both ends of the full bridge circuit.

The buck converter 100 receives the output voltage of the power factor correction circuit 300. The buck converter 100 may include a first switching element and a second switching element connected to the power factor correction circuit 300. The output voltage of the power factor correction circuit 300 may be a relatively non-constant voltage, and thus a high voltage may be generated or a low voltage may be generated. When such a non-constant voltage is directly applied to the inverter, it may be difficult to boost or drop the voltage for charging the battery 50. Accordingly, the output voltage of the power factor correction circuit 300 can be stepped down to a constant voltage through the buck converter 100.

Since the configuration and operation process of the buck boost converter to which the embodiment of the present invention is applied is the same as or similar to the configuration and operation process of a general buck converter, a detailed description thereof will be omitted.

The power transmission unit is connected in parallel with one end of the second switching element of the buck converter 100. The power transmission unit includes a first relay 511 connected to the neutral terminal of a three-phase motor, a neutral terminal capacitor 515 connected in parallel with the neutral terminal of the three-phase motor, and a second relay 513 connected in series with the neutral terminal capacitor 515. Here, it is possible to control the inverter to be used to drive the motor or to be used for charging according to on/off of the first relay 511 and the second relay 513.

When the power transmission unit uses the inverter for charging, the power transmission unit serves to transfer the power that has been stepped down by the buck converter 100 to the battery 50. Here, the inverter may include a plurality of switching elements $Q_1$ to $Q_6$, and the switching elements may be provided in the form of legs. Furthermore, the output terminal of the inverter may include an output capacitor. The inverter boosts the voltage to a high voltage necessary to charge the battery 50 through the plurality of switching elements $Q_1$ to $Q_6$ connected to each other in the inverter. The boosted power charges the battery 50.

The power system of embodiments of the present invention may be capable of bidirectional power delivery. In this case, in addition to the operation of charging the battery 50, the power system may transfer the power of the battery 50 to a load (V2L) or supply power to a home (V2H). In this case, the buck converter 100 may perform a function of boosting the power of the battery 50.

As described above, in the power conversion system shown in FIG. 1, only the power factor correction circuit 300 is extracted from the slow charging system of FIG. 3 and connected to the circuit of the conventional quick charging system using an inverter for driving a motor shown in FIG. 2 through the buck converter, and thus both quick charging and slow charging can be implemented through a single system. This can realize cost reduction and space security through system integration and cost reduction using the buck converter that is cheaper than a relay.

In addition, in contrast to the conventional slow charging system having an additional relay in the quick charging circuit using an inverter as shown in FIG. 3, embodiments of the present invention include the power factor correction circuit 300 and thus there is no risk of AC power flowing into the motor. Accordingly, it is not necessary to change the motor structure, and an additional relay for separating the W-phase of the motor is not required.

Therefore, by connecting the buck converter such that the output voltage of the power factor correction circuit 300 can satisfy the voltage range applied to the existing quick charging system using an inverter, problems of the conventional power conversion system can be solved and the conventional power conversion system can be improved.

According to the vehicle power conversion system and method of embodiments of the present invention, it is possible to perform both quick charging and slow charging using a single system by connecting a quick charging system using an inverter for driving a motor to a power factor correction circuit using a buck converter.

In addition, AC power is applied to a motor, and both quick charging and slow charging can be realized without changing a motor structure.

Furthermore, a battery charging voltage range is wide, which improves availability.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A vehicle power conversion system comprising:
   an input power supply including an AC power input;
   a battery;
   a power factor correction circuit connected to the input power supply;
   a power transmission unit comprising an inverter connected in parallel to the battery, a three-phase motor connected to the inverter, and at least one relay connected to the three-phase motor; and
   a buck converter comprising a first switching element and a second switching element, connected in parallel to the power factor correction circuit,
   wherein a first end of the second switching element is connected in parallel to the power transmission unit,
   wherein the buck converter is configured to step down an output voltage of the power factor correction circuit and transfer the stepped down output voltage to the power transmission unit, and
   wherein the power transmission unit is configured to transfer power between the buck converter and the battery via a neutral terminal of the three-phase motor.

2. The vehicle power conversion system according to claim 1, wherein the power transmission unit comprises:
   a first relay of the at least one relay connected to the neutral terminal of the three-phase motor;
   a neutral terminal capacitor connected in parallel to the neutral terminal of the three-phase motor; and
   a second relay of the at least one relay connected in series with the neutral terminal capacitor.

3. The vehicle power conversion system according to claim 2, wherein the power transmission unit is configured to control the inverter to drive the motor or to charge the battery according to an on/off state of the first relay and the second relay.

4. The vehicle power conversion system according to claim 1, wherein the buck converter is configured to boost a voltage of the battery in response to transferring power from the battery to the input power supply.

5. The vehicle power conversion system according to claim 1, further comprising a link capacitor connected in parallel to the power factor correction circuit.

6. The vehicle power conversion system according to claim 1, wherein the power factor correction circuit comprises three legs for three-phase charging.

7. The vehicle power conversion system according to claim 1,
   wherein the inverter of the power transmission unit comprises:
      a first leg comprising a third switching element and a fifth switching element,
      a second leg comprising a sixth switching element and a fourth switching element, and
      a third leg comprising an eighth switching element and a seventh switching element, and wherein output terminals of the first to third legs are connected to respective phases of the motor.

8. A method of converting power for a vehicle, the method comprising:
   receiving AC power at an input power supply;

converting, by a power factor correction circuit, the AC power into DC power;

stepping down, by a buck converter, a voltage of the converted DC power to a constant voltage;

inputting the stepped down voltage to a power transmission unit via a neutral terminal of a three-phase motor included in the power transmission unit; and boosting, by the power transmission unit, the stepped down voltage to a high voltage capable of charging a battery.

9. The method according to claim 8, further comprising switching from stepping down the voltage of the converted DC power to the constant voltage to boosting, by the buck converter, a voltage in response to transferring power from the battery to the input power supply.

10. The method according to claim 8, further comprising driving, by the power transmission unit, the three-phase motor according to an on/off state of a first relay and a second relay.

11. The method according to claim 8, wherein the power transmission unit comprises an inverter connected in parallel to the battery, the three-phase motor connected to the inverter, and at least one relay connected to the three-phase motor.

12. The method according to claim 11, wherein the buck converter comprises a first switching element and a second switching element, the buck converter being connected in parallel to the power factor correction circuit.

13. The method according to claim 11,
wherein the inverter of the power transmission unit comprises:
a first leg comprising a first switching element and a third switching element,
a second leg comprising a fourth switching element and a second switching element, and
a third leg comprising a sixth switching element and a fifth switching element, and
wherein output terminals of the first to third legs are connected to respective phases of the three-phase motor.

14. The method according to claim 8, wherein the power transmission unit comprises:
an inverter connected in parallel to the battery;
the three-phase motor connected to the inverter;
a first relay connected to the neutral terminal of the three-phase motor;
a neutral terminal capacitor connected in parallel to the neutral terminal of the three-phase motor; and
a second relay connected in series with the neutral terminal capacitor.

15. The method according to claim 14, further comprising controlling the inverter to drive the motor or to charge the battery according to an on/off state of the first relay and the second relay.

16. A vehicle comprising:
a vehicle body;
a battery housed in the vehicle body;
an input power supply having an AC power input;
a power factor correction circuit connected to the input power supply;
a power transmission unit comprising an inverter connected in parallel to the battery, a three-phase motor connected to the inverter, and at least one relay connected to the three-phase motor; and
a buck converter comprising a first switching element and a second switching element, connected in parallel to the power factor correction circuit,
wherein a first end of the second switching element is connected in parallel to the power transmission unit,
wherein the buck converter is configured to step down an output voltage of the power factor correction circuit and transfer the stepped down output voltage to the power transmission unit, and
wherein the power transmission unit is configured to transfer power between the buck converter and the battery via a neutral terminal of the three-phase motor.

17. The vehicle according to claim 16, wherein the power transmission unit comprises:
a first relay of the at least one relay connected to the neutral terminal of the three-phase motor;
a neutral terminal capacitor connected in parallel to the neutral terminal of the three-phase motor; and
a second relay of the at least one relay connected in series with the neutral terminal capacitor.

18. The vehicle according to claim 17, wherein the power transmission unit is configured to control the inverter to drive the motor or to charge the battery according to an on/off state of the first relay and the second relay.

19. The vehicle according to claim 16, further comprising a link capacitor connected in parallel to the power factor correction circuit.

20. The vehicle according to claim 16,
wherein the inverter of the power transmission unit comprises:
a first leg comprising a third switching element and a fifth switching element,
a second leg comprising a sixth switching element and a fourth switching element, and
a third leg comprising an eighth switching element and a seventh switching element, and
wherein output terminals of the first to third legs are connected to respective phases of the three-phase motor.

* * * * *